United States Patent [19]

Seki

[11] Patent Number: 5,333,320

[45] Date of Patent: Jul. 26, 1994

[54] ELECTRONIC COMPUTER SYSTEM AND PROCESSOR ELEMENT USED WITH THE COMPUTER SYSTEM

[76] Inventor: Hajime Seki, 4-38, Kita-machi, Dougo, Matsuyama-shi, Ehime-ken, 790, Japan

[21] Appl. No.: 923,928

[22] PCT Filed: Jun. 4, 1990

[86] PCT No.: PCT/JP90/00724

§ 371 Date: Sep. 8, 1992

§ 102(e) Date: Sep. 8, 1992

[87] PCT Pub. No.: WO91/10967

PCT Pub. Date: Jul. 25, 1991

[30] Foreign Application Priority Data

Jan. 9, 1990 [JP] Japan .................................. 2-2146
Apr. 2, 1990 [JP] Japan .................................. 2-88980

[51] Int. Cl.$^5$ .................................. G06F 15/16
[52] U.S. Cl. .................................. 395/650; 395/800; 364/DIG. 1; 364/228.3; 364/229.2; 364/230.3
[58] Field of Search .................. 364/DIG. 1 MS File, 364/DIG. 2 MS File; 395/650, 325, 375, 800

[56] References Cited

U.S. PATENT DOCUMENTS 4,916,657  4/1990  Morton .......................... 364/DIG. 2
5,099,418  3/1992  Pian et al. ..................... 364/DIG. 1

Primary Examiner—Thomas M. Heckler
Attorney, Agent, or Firm—Jones, Tullar & Cooper

[57] ABSTRACT

A data-driven electronic computer system and processor element used for the same system. The present data-driven computer system comprises a control processor, a plurality of processor elements, and a plurality of memory devices each of which is directly accessed by its corresponding processor element, wherein data transfers can be performed in packet transmission among all the processor elements. Each processor element has an operation control unit which performs arithmetic/logic operations in a data-driven manner, and a communication control unit which performs data transfers between the processor elements.

5 Claims, 9 Drawing Sheets

ELECTRONIC COMPUTER SYSTEM AND PROCESSOR ELEMENT USED WITH THE COMPUTER SYSTEM

FIELD OF THE INVENTION

The present invention relates to a data-driven type computer system and a processor element used with the computer system.

DESCRIPTION OF THE PRIOR ART

As a computer system in which a plurality of processors operate in parallel, there has been available one in which a plurality of Neuman type processors are connected. Such a system, however, has suffered from a problem, namely, synchronization among the processors as well as communications control becomes complex. Moreover, increased efficiency is difficult to achieve without taking into consideration the contents of jobs and the architecture of the processors in preparing programs.

SUMMARY OF THE INVENTION

The present invention addresses the foregoing problems, and its essential object is to provide a data-driven type electronic computer system having processor elements, wherein arithmetic/logic operations in individual processor elements, data communications among processor elements and other similar operations are performed in a data-driven manner (each operation is performed when required data are fully prepared), asynchronously, thereby achieving highly efficient computation.

The data-driven computer system according to the present invention includes two systems: system 1 and system 2. From the hardware point of view, either system comprises a control processor, a plurality of processor elements, and a plurality of memory devices each of which is directly accessed only by its corresponding processor element (hereinafter in the specification the control processor will be referred to as "CP" and the processor element as "PE"), wherein data transfers may be performed in packet transmission among all the PEs; each PE has an operation control unit which performs arithmetic/logic operations and the like, and a communication control unit which performs data transfers to a destination PE (hereinafter in the specification the operation control unit will be referred to as "OCU" and the communication control unit as "CCU"); both the OCU and the CCU are designed to perform in a data-driven manner; the system 1 is so structured that, to instruct PEs to perform operations, the CP broadcasts a program statement to the PEs; and the system 2 is so structured that, with part of a job described in the form of a set of subsections each of which is assigned to one of the PEs and stored in its corresponding memory device, the CP instructs the PEs to activate respectively corresponding subsections so that the part of the job will be executed.

The PE also herein proposed comprises a data memory with an associative function for simultaneously comparing a variable identifier transmitted to the data memory with variable identifiers each of which is held in one of the cells of the data memory, and writing a data transmitted together with the variable identifier transmitted to the data memory in each cell of the data memory matched by comparison, a stack memory having cells each of which is designed to hold an address of a cell of the data memory, an instruction memory having cells each of which is designed to hold the content of an operation defined by a program statement, and an operation unit for performing an arithmetic/logic operation specified in a cell of the instruction memory when operand data required for the arithmetic/logic operation are fully prepared in the data memory; and the PE is designed to perform the arithmetic/logic operations defined by a program statement arranged in reverse Polish notation in a data-driven manner after setting the data memory and the instruction memory by using the stack memory. (Hereinafter in the specification the data memory will be referred to as "DM", the stack memory as "SM", the instruction memory as "IM" and the operation unit as "OU").

Important terms are listed below to clarify their meanings in the context of the present invention.

Variable identifier: Variable identifier, in general, refers to an identifier assigned to a data, a storage area address of a data which has its storage area in a memory device, a modified address expression immediately definable in each PE or an address expression of a vector variable. In the specification herein, however, a variable refers to a scalar variable, unless otherwise noted.

Program element: Program element refers to a variable identifier, an immediate data, or an operator indicative of an arithmetic/logic operation, a store operation or the like. Each individual program element is tagged so that a variable identifier, an immediate data and an operator are mutually discriminated: in the case of a variable identifier, tagging clarifies the difference between a scalar and a vector, a mode of address modification, and the difference between representation of an operand address and representation of a result storage address; and in the case of an operator; tagging clarifies the number of operands the operator needs.

Program statement: Program statement refers to a series of program elements arranged meaningfully in reverse Polish notation.

Subsection: Subsection refers to a fragment of a program assigned to a PE, wherein a portion which causes the OCU in the PE to perform arithmetic/logic operations is described by program statements.

PREFERRED DETAILED DESCRIPTION OF THE EMBODIMENTS

Figure 1:
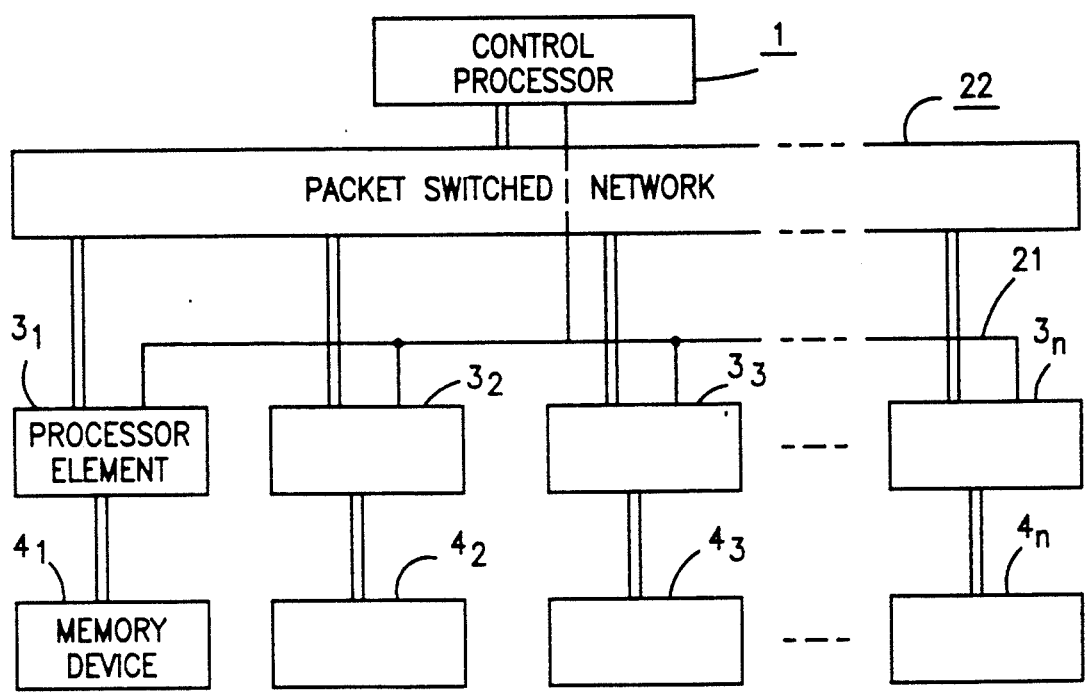
FIG. 1 is a block diagram showing a basic structure common to both a system 1 and a system 2, according to the present invention.

FIG. 1 is a block diagram of the basic hardware structure of the system according to the present invention. Shown in FIG. 1 are a control processor (CP) 1, a broadcast network 21, a packet switched network 22, processor elements (PEs) $3_1$–$3_n$, and memory devices $4_1$–$4_n$.

In the systems according to the present invention, i.e., both system 1 and system 2, the broadcast network 21 from the CP 1 is linked to each of PE $3_1$–$3_n$, and each of PEs $3_1$–$3_n$ is linked to its corresponding one of memory devices $4_1$–$4_n$ in a manner that allows direct access between them. The packet switched network 22 is available for data communications among PEs $3_1$–$3_n$ and the CP 1. The broadcast network 21 may be replaced with a bus which has the link identical with that of the network 21.

In the embodiments described below, it is assumed that every variable has its own storage area in one of the memory devices, and that a variable identifier appearing in a program statement expresses a storage area address either of an operand or of a result.

In the system 1 according to the present invention, the CP broadcasts program elements which compose a program statement one by one to PEs so as to set the PEs to perform operations defined by the program statement.

The OCU in each PE which is assigned to perform arithmetic/logic operations defined by the program statement is set so that the arithmetic/logic operations will be performed in a data-driven manner.

In the CCU in each PE which is endowed with direct access to any of operand data needed for the arithmetic/logic operations defined by the program statement, when the above-mentioned operand data is obtained, the above-mentioned operand data is transferred to the PE which is assigned to perform the arithmetic/logic operations by using the above-mentioned operand data.

In each of the OCU and CCU, any operation or any data transfer performable with required data fully prepared, is automatically performed.

In the system 1 according to the present invention, the CP may broadcast program statements continuously as long as no exceptional event takes place in any of the PEs.

Described below are the components which make up the system 1 of the present invention, and their behavior.

(I) Control Processor (CP)

The CP broadcasts, to PEs, the leading word {EXEC} and program elements which compose the program statement, one by one.

In each PE, when any of the DM, the IM, the data transfer control memory, and the non-stored variable list, all described later, is about to overflow (hereinafter in the specification the non-stored variable list will be referred to as "NSVL" and the data transfer control memory as "DTCM"), or when the program element broadcast from the CP represents a variable identifier indicative of a result storage address which is already written either in the later-described transfer variable field of the DTCM or in the NSVL (this means a change of a variable data in use in any of the PEs), the PE so notifies the CP, thereby causing the CP to stop broadcasting to PEs. When the above-described condition is removed, the PE so notifies the CP, thereby causing the CP to start broadcasting again.

(II) Processor Element (PE)

Figure 2:
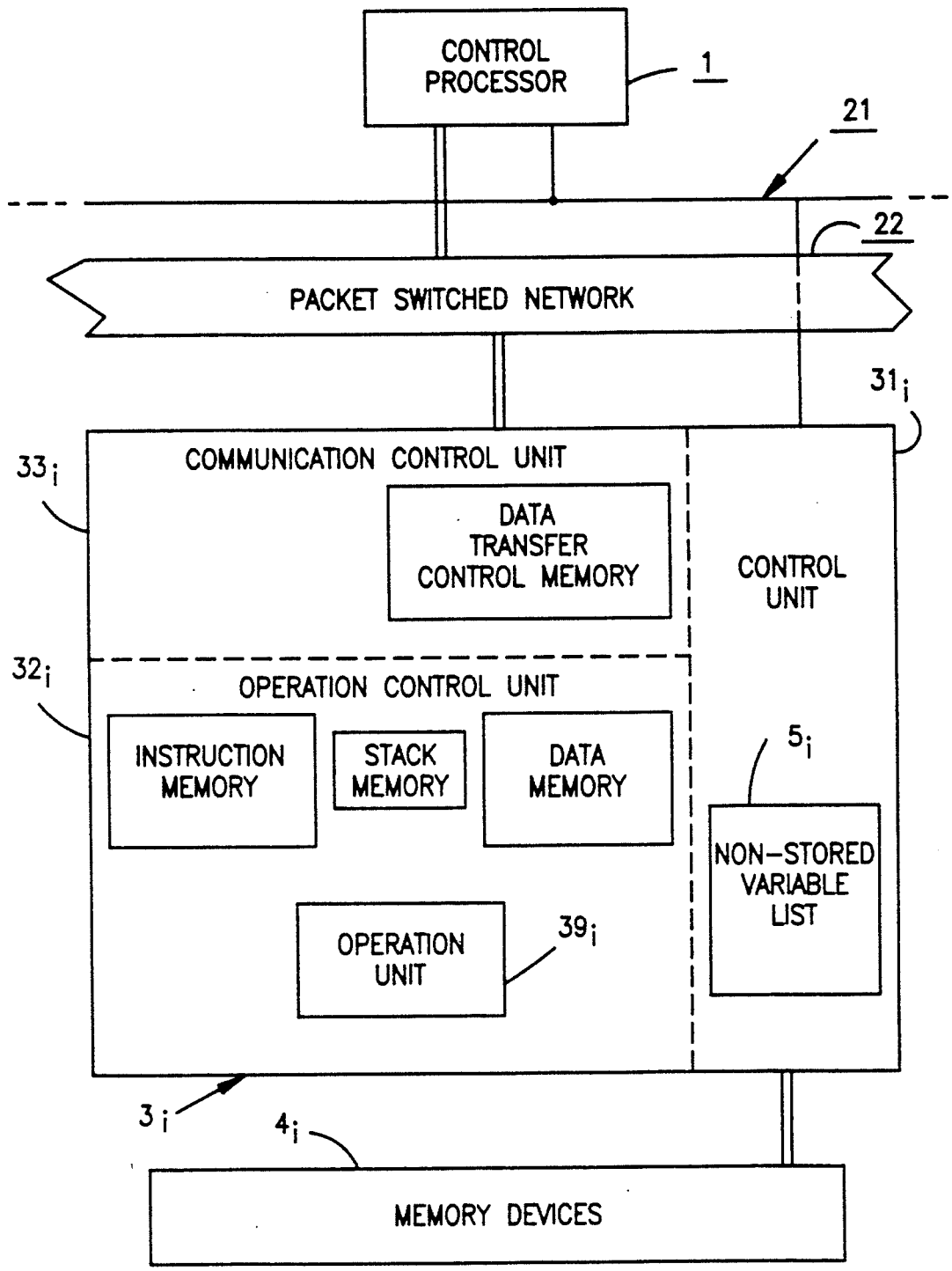
FIG. 2 is a block diagram showing a detailed structure of a PE according to the present invention.

FIG. 2 is a block diagram showing a detailed structure of the PE according to the present invention. Each PE, which is made of a control unit, an operation control unit (OCU) and a communication control unit (CCU), may be applied to both the system 1 and the system 2 (hereinafter in the specification the control, unit will be referred to as "CU"). Indicated in FIG. 2 are CU $31_i$, OCU $32_i$, and CCU $33_i$, where $1 \leq i \leq n$. CU $31_i$ has non-stored variable list (NSVL) $5_i$ described later; OCU $32_i$ has stack memory (SM) $7_i$, data memory (DM) $8_i$, instruction memory (IM) $9_i$ and operation unit (OU) $39_i$, all described later. CCU $33_i$ has data transfer control memory (DTCM) $6_i$ described later.

(II-1) Control Unit (CU)

The CU in each PE is so designed that it carries out adjustment and control of actions of the OCU and the CCU, and controls accesses to the memory device.

In each CU of the system 1, when the program element in a program statement sent from the CP represents a variable identifier which is a modified address expression, address calculation is immediately performed to replace the modified address expression.

Furthermore, in order to avoid confusion in connection with a change of a variable data, each CU has a NSVL for holding addresses of a storage area in which a data has not been stored yet although the PE was set so as to store that data in the memory device.

The description that follows is the action of the CU of the system 1 according to the present invention.

In the system·1 of the present invention, while each PE receives from the CP a program statement, which is composed of program elements, in succession to the word {EXEC}, the CU carries out the following actions (1) and/or (2) in parallel.

(1) In each PE which is assigned to perform arithmetic/logic operations defined by the program statement, the program statement is delivered to the OCU so that the arithmetic/logic operations are set to be performed in a data-driven manner. In this embodiment, the PE which is endowed with direct access to the memory device containing a result storage area indicated in a program statement is designed to perform the arithmetic/logic operations defined by the program statement to generate the result, unless otherwise noted.

Hereupon, if the same variable identifier as the result storage address is already written either in the NSVL or in a later-described transfer variable field of the DTCM, the following action (X)/(Y) is performed in order to avoid confusion in connection with a change of a variable data.

(X) If the same variable identifier as the result storage address is already written in a later-described transfer variable field of the DTCM, the CP is requested to stop broadcasting the program statement. Later, the data corresponding to the same variable identifier will be written in the DTCM if the whole system has been normally set. Then, the CP is requested to restart broadcasting the program statement.

(Y) If the same variable identifier as the result storage address is already written in the NSVL, the CP is requested to stop broadcasting the program statement.

Later, the same variable identifier will be deleted from the NSVL if the whole system has been normally set. Then, the CP is requested to restart broadcasting the program statement.

At the end of the program statement, the result storage address is written in the NSVL in the PE which is directly accessible to the result storage area. Hereupon, the variable identifier indicative of the result storage address is retained in an unshown register, while the program statement is broadcast.

When the OCU completes the calculation defined by the program statement, the CU is requested to store the result data in the memory device. Then, the CU requests the memory device to store the result data. On completion of storing, the address of the result storage area is deleted from the NSVL.

(2) In each PE, each time directly accessible one is recognized from among operand variables presented in the program statement, the CCU is set so that, when the data corresponding to the above-mentioned operand variable is obtained, the data will be transferred to the PE which performs the arithmetic/logic operations by using the above-mentioned operand variables. It is possible to know the destination PE for each operand variable; the variable identifier indicative of the result storage area is retained in the unshown register, while the program statement is broadcast.

Hereupon, if the same variable identifier as that of the above-mentioned operand variable does not exist in the NSVL, a fetch request for the corresponding variable data is given to the memory device. The data fetched from the memory device in response to the fetch request is then transmitted to the CCU together with the variable identifier.

Conversely, if the same variable identifier as that of the above-mentioned operand variable exists in the NSVL, the PE is set so that, when the corresponding variable data is obtained in the OCU, the corresponding variable data will be transmitted to the CCU together with the variable identifier.

As detailed above, in the system 1 according to the present invention, each PE performs accesses to the memory device and transfers of operand data between PEs, on an automatic basis, without explicit instructions issued by the CP.

In the case where memory devices $4_1$–$4_n$ constitute interleaved memory banks, vector operation may be performed by defining a vector variable and using the defined vector variable in a program statement. Tagging or the like may be used to differentiate a vector variable from a scalar variable. A vector variable may be described, for example, by specifying the address of the heading vector element, the address interval between vector elements, and the number of the vector elements. The CU in each PE, for each program element representing a vector variable, judges if any vector element belonging in the memory device directly linked to the PE exists. If a directly accessible vector element exists, the OCU and/or the CCu is set so that the vector element will be processed in the same manner as in the case of a scalar operation.

In each PE, when any of the NSVL, the DTCM described later, the DM described later and the IM also described later, is about to overflow, the PE so notifies the PE, thereby causing the CP to stop broadcasting to PEs. When the above-mentioned condition is removed, the PE so notifies the CP, thereby causing the CP to restart broadcasting.

It may be possible for the CP to be notified of various control information as mentioned above by establishing signal lines. Alternatively, a dedicated device may be provided to collect control information from all the PEs.

(II-2) Operation Control Unit (OCU)

The OCU in each PE comprises a stack memory (SM), a data memory (DM), an instruction memory (IM) and an operation unit (OU), all described later. The OCU is so designed that it performs arithmetic/logic operations defined by a program statement delivered from the CU, in a data-driven manner. In the system 1 according to the present invention, the program statement delivered from the CU to the OCU has been originally sent from the CP to the CU in succession to the word {EXEC}.

The components of the OCU are described below.

(a) Stack Memory (SM)

The SM has cells each of which is designed to hold a DM cell address. Namely, a DM cell address may be pushed onto it, or a DM cell address may be popped from it.

(b) Data Memory (DM)

Figure 3:
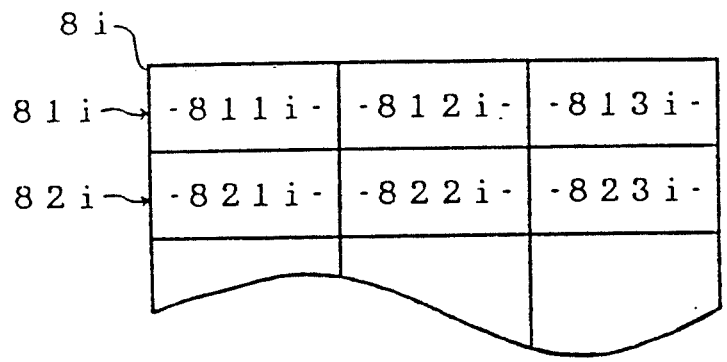
FIG. 3 illustrates a data memory in detail.

FIG. 3 illustrates the structure of the DM in detail. Cells $81_i$, $82_i$, ... form the DM $8_i$. Each DM cell is made of a matching field ($811_i$, $821_i$, ...), a data field ($812_i$, $822_i$, ...) and a data control field ($813_i$, $823_i$, ...).

Each matching field is designed to hold a variable identifier. Each data field is designed to accommodate an immediate data, the data corresponding to the content in the matching field of the same cell or the like.

The DM has an associative function for simultaneously comparing a variable identifier transmitted to the DM with variable identifiers each of which is held in one of the matching fields of the DM, and writing a data transmitted together with the variable identifier transmitted to the DM in the data field of each DM cell matched by comparison.

Each data control field is where control information is held, for example, indicating whether the cell is now in use, whether an entry has been made in the data field of the cell, and the like.

(c) Instruction Memory (IM)

The IM is designed to hold contents of a program statement arranged in reverse Polish notation, in the form of a set of individual operations whose operand data are to be held in DM cells.

Figure 4:
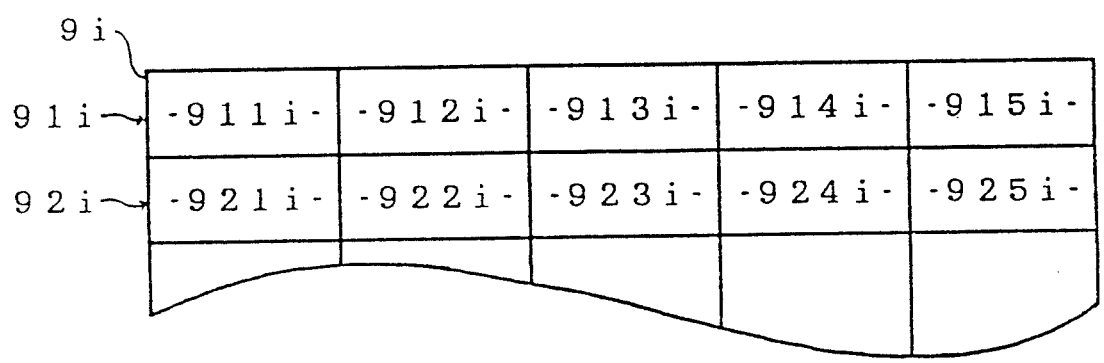
FIG. 4 illustrates an instruction memory in detail.

FIG. 4 illustrates the structure of the IM in detail. Cells $91_i$, $92_i$, ... form the IM $9_i$. Each IM cell is made of an operation field ($911_i$, $921_i$, ...) which is designed to hold the code of an operator, a first operand field ($912_i$, $922_i$, ...), a second operand field ($913_i$, $923_i$, ...), a result field ($914_i$, $924_i$, ...), and an instruction control field ($915_i$, $925_i$, ...). Each of a first operand field, a second operand field and a result field is designed to hold a DM cell address.

The instruction control field is where control information is held, for example, indicating whether the cell is now in use, whether an entry of a data has been made in the DM cell whose address is indicated in the first operand field of the same IM cell, whether an entry of a data has been made in the DM cell whose address is indicated in the second operand field of the same IM cell, and the like.

In this embodiment, it is assumed that each operator takes two operands or less. If the number of operand fields of each IM cell is increased, however, an operator taking more operands may be utilized.

(d) Operation Unit (OU)

The OU is so designed that it performs arithmetic/logic operations each of which is specified in an IM cell.

The OU may have the pipeline processing capability, or may be made up of a plurality of arithmetic/logic units which can operate in parallel.

Next, the action of the OCU of the PE is described below.

When a program statement which implies calculation of a variable data is delivered from the CU to the OCU, the OCU is set so that the calculation defined by the program statement will be performed in a data-driven manner, by taking one of the following five different actions for each program element.

(1) If the program element represents a variable identifier indicative of a result storage address, an unoccupied DM cell is secured, the variable identifier indicative of the result storage address is written in the data field of the DM cell secured, and the address of the DM cell secured is pushed onto the SM.

(2) If the program element represents a variable identifier of an operand, an unoccupied DM cell is secured, the variable identifier of the operand is written in the matching field of the DM cell secured, and the address of the DM cell secured is pushed onto the SM.

(3) If the program element represents an immediate data, an unoccupied DM cell is secured, the immediate data is written in the data field of the DM cell secured, and the address of the DM cell secured is pushed onto the SM.

(4) If the program element represents an operator to generate a result data such as an arithmetic/logic operator, an unoccupied DM cell is reserved for the result data, addresses of a DM cell, to the number of operands the operator needs, are popped from the SM, an unoccupied IM cell is secured, the code of the operator is written in the operation field of the IM cell secured, the addresses popped from the SM are written in the respective operand fields of the IM cell secured, the address of the DM cell reserved is written in the result field of the IM cell secured, and the address of the DM cell reserved is pushed onto the SM.

(5) If the program element represents an operator to generate no result data such as the operator "=" which means assignment of a data (or store of a data), addresses of a DM cell, to the number of operands the operator needs, are popped from the SM, an unoccupied IM cell is secured, the code of the operator is written in the operation field of the IM cell secured, and the addresses popped from the SM are written in the respective operand fields of the IM cell secured.

Described below is the behavior of the OCU in the PE based on a data-driven manner.

When a variable data, together with its corresponding variable identifier, is transmitted to the OCU in the PE, by virtue of the associative function of the DM, the variable identifier is simultaneously compared with variable identifiers each of which is held in one of the matching fields of the DM, and the variable data is written in the data field of each DM cell matched by comparison.

When the operand data which were to be held in the respective DM cells whose addresses are indicated in the respective operand fields of an IM cell in which an arithmetic/logic operation is specified are fully prepared in the DM, the arithmetic/logic operation specified in the IM cell is performed in the OU, and then the result data is written in the data field of the DM cell whose address is indicated in the result field of the IM cell.

When the operand data which were to be held in the respective DM cells whose addresses are indicated in the respective operand fields of an IM cell in which a store operation is specified are fully prepared in the DM, the CU is requested to store the data.

When the operation specified in an IM cell is completely performed, both the IM cell in which the operation is specified and the DM cells each of which has been holding one of the operand data are freed for later use.

In the embodiment herein, an unoccupied cell of the DM is secured, each time a program element representing a variable identifier of an operand is delivered to the OCU. In the present invention, however, when there is a DM cell which is already holding the same variable identifier in the matching field, that DM cell may be assigned to the program element. In that case, any unoccupied DM cell need not be secured.

Figure 6:
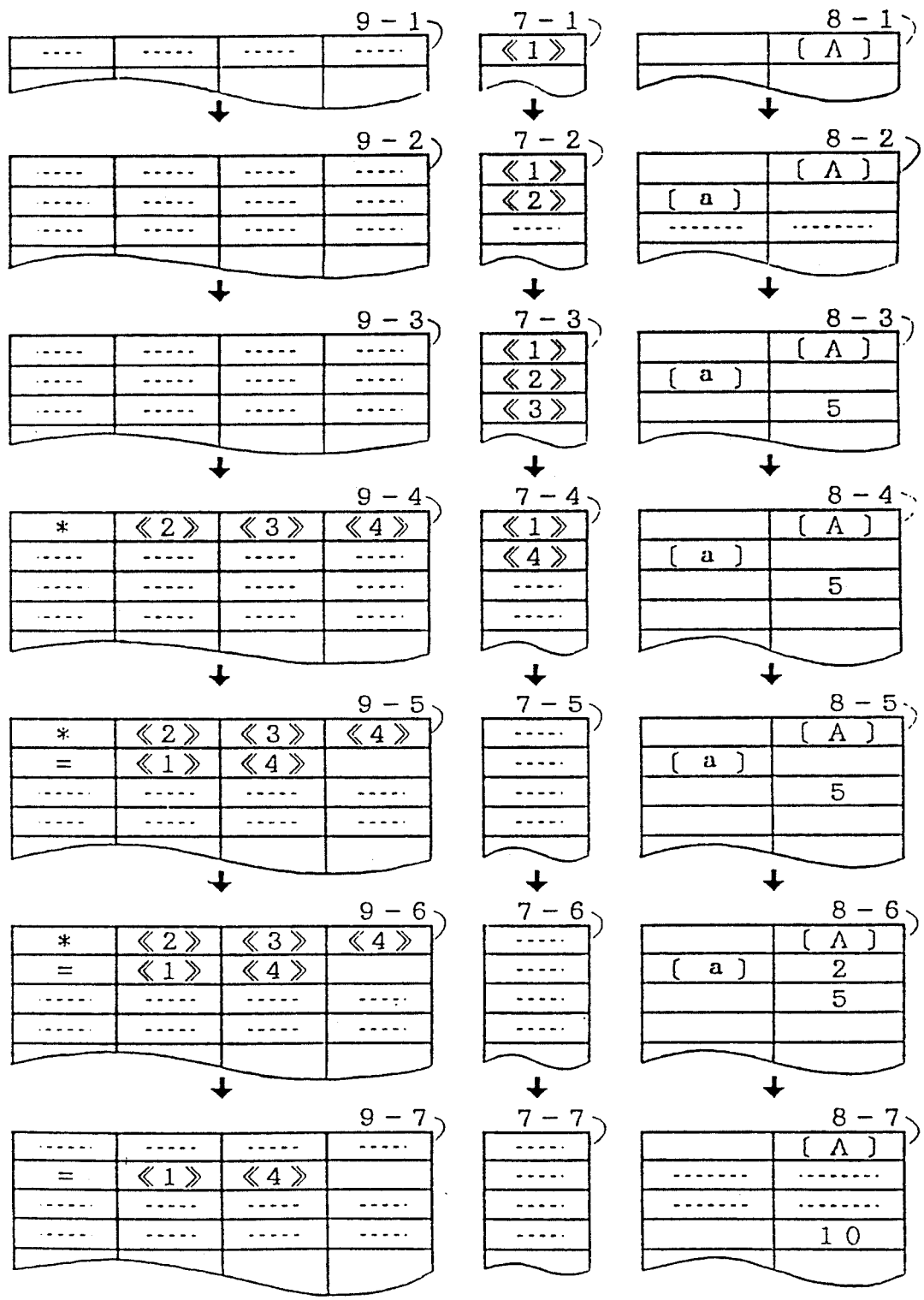
FIG. 6 shows the contents in a stack memory, a data memory and an instruction memory, in the course of action in a PE.

FIG. 6 illustrates the behavior of the OCU in the PE. Referring to FIG. 6, the action is described further in detail.

The DM and the IM shown in FIG. 6 are identical with the DM in FIG. 3 and the IM in FIG. 4 respectively, except that the data control field of each DM cell and the instruction control field of each IM cell are omitted in FIG. 6. Each cell where broken lines are drawn in FIG. 6 is unoccupied. (In FIG. 6, as the action is in progress, each reference numeral is followed by a hyphen and a stepwise increasing number indicating the step of action, in order to show the contents in each component with progress.)

It is assumed that a program statement, for example, {[A], [a], 5, *,=} (meaning [A]=[a]*5), is delivered to the OCU.

When the program element representing the variable identifier [A] indicative of a result storage address is delivered to the OCU, the cell with an address $<<1>>$ of the DM 8-1 is assigned to the variable identifier [A], the variable identifier [A] is written in the data field of the DM cell, and simultaneously, the address $<<1>>$ of the DM cell is pushed onto the SM as in 7-1 in FIG. 6. Hereupon, each cell of the DM and the IM is tagged with address, 1, 2, 3, ... from the top down, in FIG. 6.

When the program element representing the variable identifier [a] of an operand is delivered to the OCU, the cell with an address $<<2>>$ of the DM 8-2 is assigned to the variable identifier [a], the variable identifier [a] is written in the matching field of the DM cell, and simultaneously, the address $<<2>>$ of the DM cell is pushed onto the SM as in 7-2 in FIG. 6.

When the program element representing the immediate data '5' is delivered to the OCU, the cell with an address $<<3>>$ of the DM 8-3 is assigned to the immediate data '5', the data '5' is written in the data field of the DM cell, and simultaneously, the address $<<3>>$ of the DM cell is pushed onto the SM as in 7-3 in FIG. 6.

When the program element representing the operator '*' is delivered to the OCU, the cell with an address $<<4>>$ of the DM 8-4 is reserved for the result data to be generated by the operator '*', two addresses $<<2>>$, $<<3>>$ are popped from the SM (the operator '*' is a dyadic operator), and the cell with an address 1 of the IM 9-4 is secured for holding the content of the arithmetic operation. Namely, the code of the operator '*' is written in the operation field of the IM cell, the addresses <<2>> and <<3>> popped from the SM are written in the first and second operand fields of the IM cell respectively, and the address <<4>> of the DM cell reserved for the result data is written in the result field of the IM cell. The address <<4>> of the DM cell is pushed onto the SM as in 7-4 in FIG. 6.

When the program element representing the operator '=' meaning assignment of a data (or store of a data) is delivered to the OCU, two addresses <<1>>, <<4>> are popped from the SM (here, the operator '=' is assumed to be a dyadic operator), and the cell with an address 2 of the IM 9-5 is secured for holding the content of the store operation. Namely, the code of the operator '=' is written in the operation field of the IM cell, the addresses <<1>> and <<4>> popped from the SM are written in the first and second operand fields of the IM cell respectively. Thus, the OCU is set so that the calculation meaning [A]=[a]*5 will be performed in a data-driven manner.

When the data '2', together with the variable identifier [a], is transmitted to the OCU, the associative function of the DM allows the data '2' to be written in the data field of the DM cell which is holding the variable identifier [a] in the matching field, as in 8-6 in FIG. 6.

Then, the arithmetic operation specified in the cell with the address 1 of the IM 9-6 becomes performable, so the content in the IM cell with the address 1 is sent to the OU 7 to be performed there. Thereafter, the IM cell with the address 1 and the two DM cells with the addresses <<2>>, <<3>> are freed.

When the OU provides a data '10' as the arithmetic operation result, the result '10' is written in the data field of the DM cell with the address <<4>>, which was indicated in the result field of the IM cell with the address 1.

Then, the store operation specified in the cell with the address 2 of the IM 9-7 becomes performable, so the CU is requested to store the data '10' in the result storage area specified by the variable identifier [A]. Thereafter, the IM cell with the address 2 and the two DM cells with the addresses <<1>>, <<4>> are freed.

(II-3) Communication Control Unit (CCU)

The CCU in each PE is so designed that it performs data transfers to a destination PE through the packet switched network.

Each CCU is provided with a later-described data transfer control memory (DTCM). Retaining variable identifiers to be transferred and their respective destinations, the DTCM allows each data transfer to be performed toward its corresponding destination when the variable data corresponding to the variable identifier to be transferred is obtained.

Figure 5:
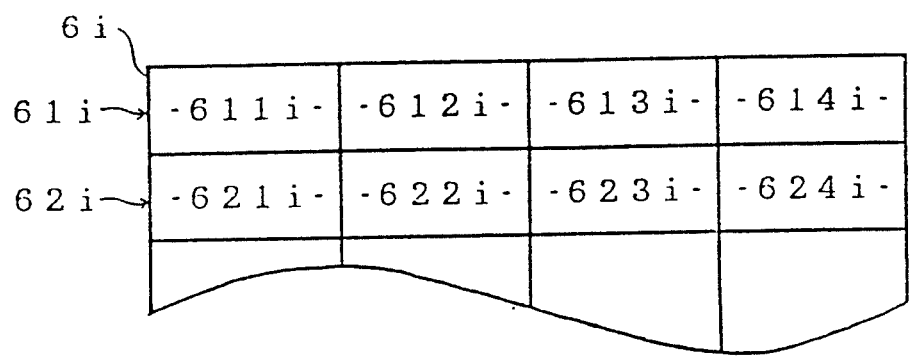
FIG. 5 illustrates a data transfer control memory in detail.

FIG. 5 illustrates the structure of the DTCM in detail. Cells $61_i$, $62_i$, ... make up the DTCM $6_i$. Each cell is made of a destination field ($611_i$, $621_i$, ... ) where a destination PE is specified, a transfer variable field ($612_i$, $622_i$, ... ) which is designed to hold a variable identifier to be transferred, a transfer data field ($613_i$, $623_i$, ... ) which is designed to hold a data to be transferred, and a transfer control field ($614_i$, $624_i$, ... ).

The DTCM has an associative function for simultaneously comparing a variable identifier transmitted to the DTCM with variable identifiers each of which is held in one of the transfer variable fields of the DTCM, and writing a data transmitted together with the variable identifier transmitted to the DTCM in the transfer data field of each DTCM cell matched by comparison.

Each transfer control field is where control information is held, for example, indicating whether the cell is now in use, whether an entry has been made in the transfer data field of the cell, and the like.

Next, the action of the CCU is described below.

In each of the system 1 and the system 2 according to the present invention, each time the CU requests the CCU to set a data transfer by specifying both a variable identifier to be transferred and a destination PE, an unoccupied cell of the DTCM is secured, and entries are made both in the transfer variable field and in the destination field of the secured DTCM cell. Any unoccupied DTCM cell need not be secured, however, if both the same variable identifier to be transferred and the same destination are already written in a DTCM cell.

The CP can request a PE to set a data transfer by a command. On that occasion entries are made both in the destination field and in the transfer variable field of an unoccupied cell of the DTCM. The destination in this case is the CP.

Each variable data to be transferred is designed to be transmitted, together with its corresponding variable identifier, either from the OCU $32_i$ or from the memory device $4_i$. When a variable data, together with its corresponding variable identifier, is transmitted to the CCU, by virtue of the associative function of the DTCM, the variable identifier is simultaneously compared with variable identifiers each of which is held in one of the transfer variable fields of the DTCM, and the variable data is written in the transfer data field of each DTCM cell matched by comparison.

The content in a DTCM cell in which an entry of the data to be transferred has been made is sent out through the packet switched network. Then, the DTCM cell is freed, making it available for another data transfer.

In the embodiment, it is assumed for simplicity that data transfers to the OCU in the same PE go from the CCU through the pocket switched network.

Referring now to FIG. 7 through FIG. 10, the behavior of the system 1 according to the present invention is described below, wherein the system 1 comprises two PEs, $3_1$ and $3_2$, connected to memory devices $4_1$ and $4_2$, respectively.

Figure 7:
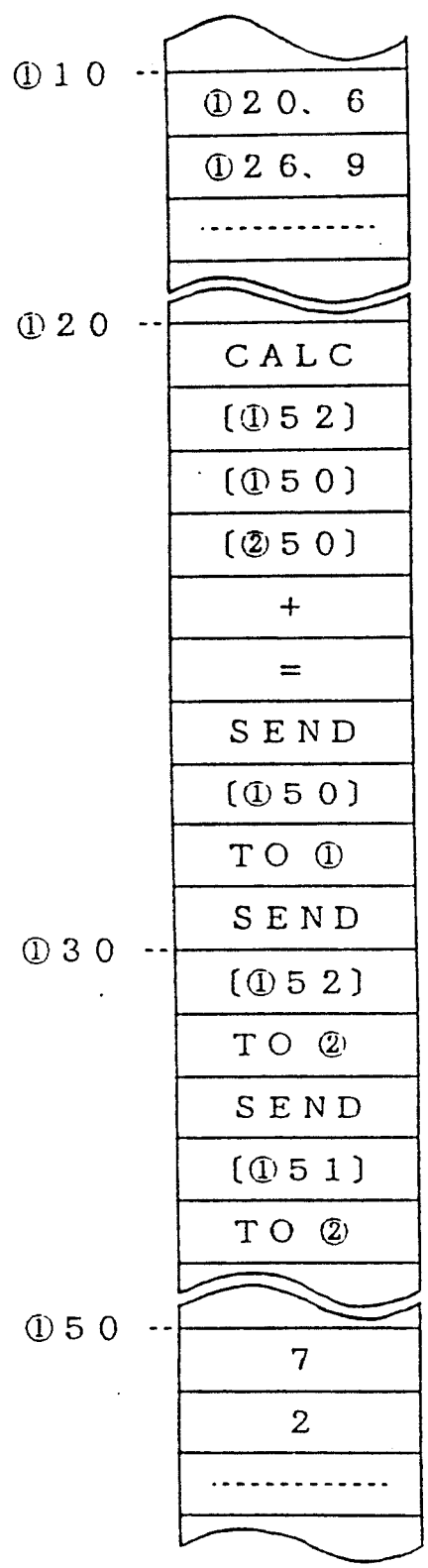
FIG. 7 shows the initial contents in a memory device, supposed for explaining the behavior of the arrangement made of two sets of a PE and a memory device.
Figure 8:
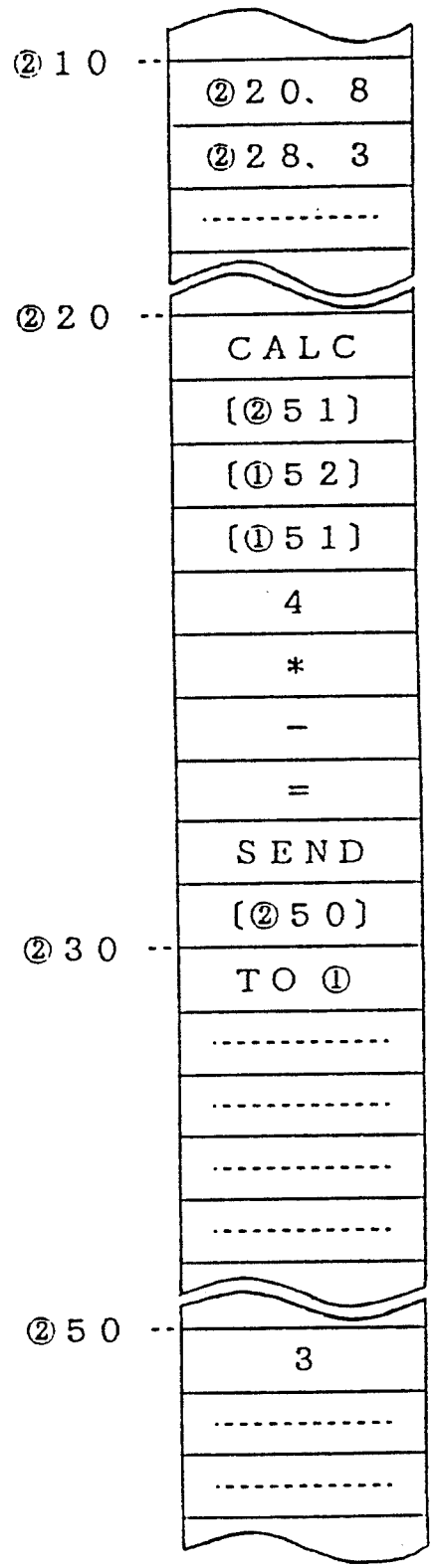
FIG. 8 shows the initial contents in the other memory device, supposed for explaining the behavior of the above-mentioned arrangement.

FIG. 7 and FIG. 8 show the initial contents written in memory devices $4_1$ and $4_2$, respectively. (In the following, (1) and (2) preceding any number refer to memory devices $4_1$ and $4_2$, respectively. For example, (1)20 represents the address 20 in memory device $4_1$, and [(1)20] represents the variable or the variable identifier having its data storage area in the address (1)20).

Figure 9:
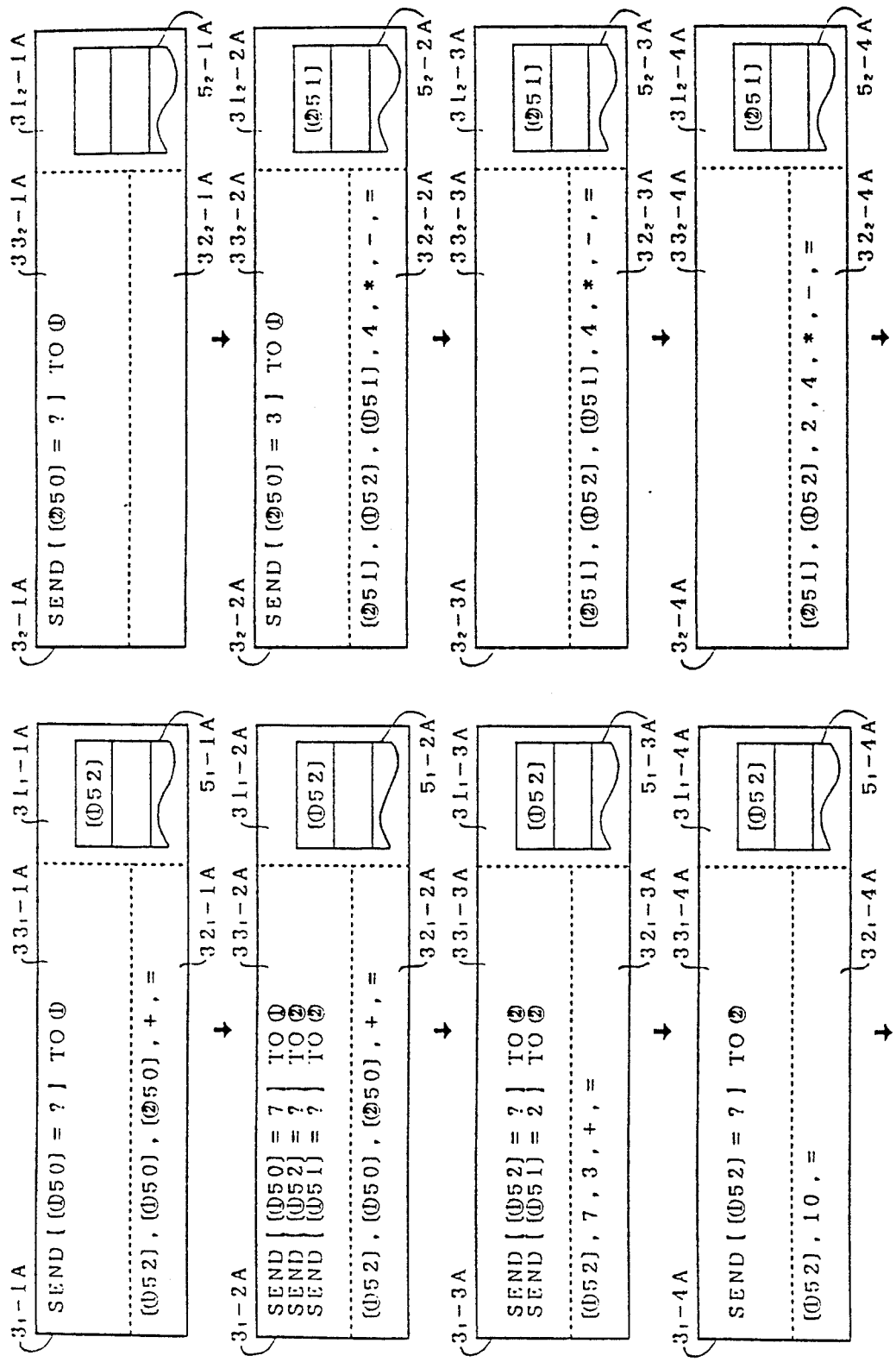
FIG. 9 shows the behavior of the above-mentioned two PEs in the system 1.
Figure 10:
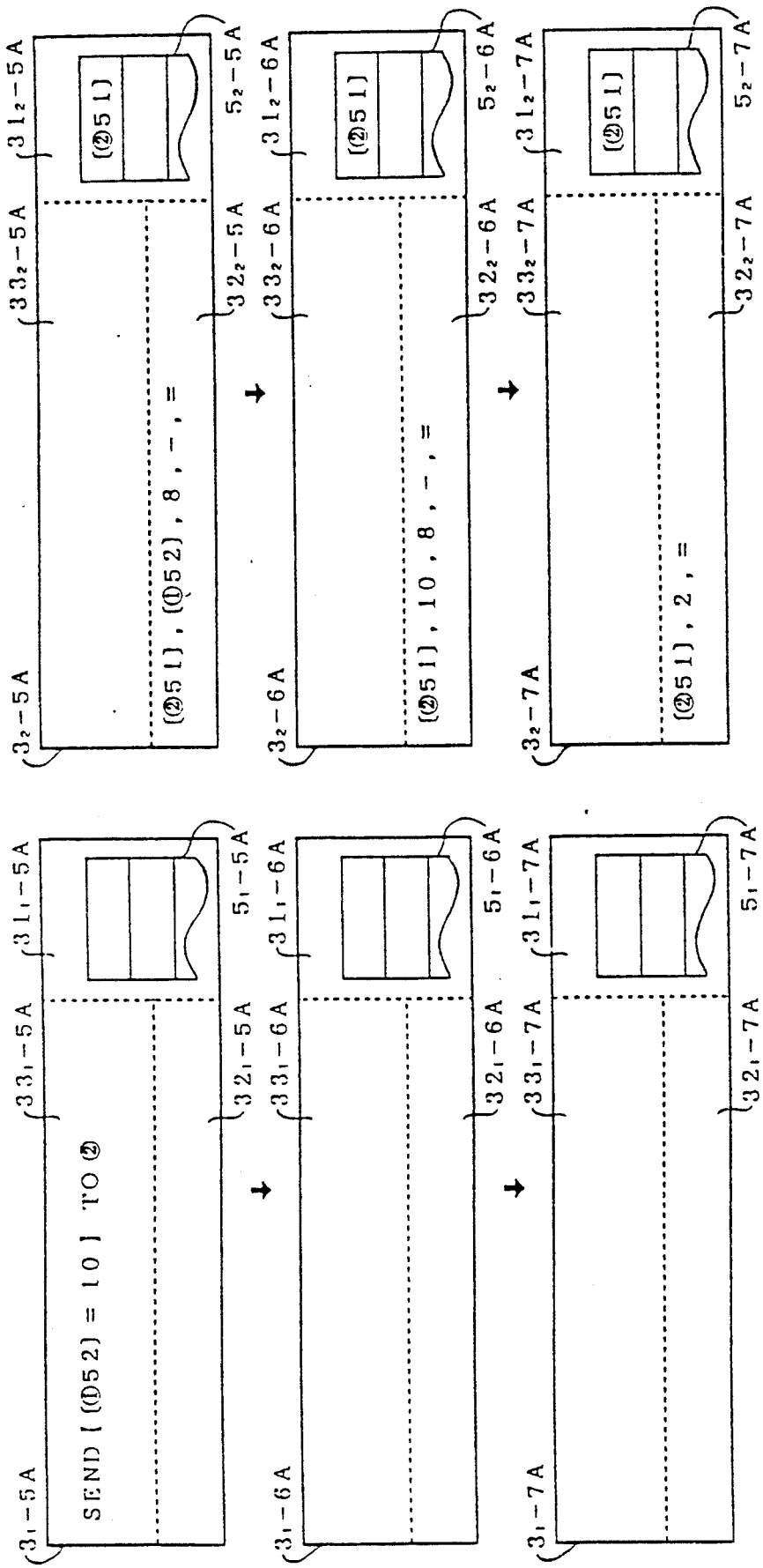
FIG. 10 shows the behavior of the above-mentioned two PEs in the system 1.

FIG. 9 and FIG. 10 illustrate the behavior of the above two PEs in the system 1 according to the present invention. Referring to both figures, the behavior is described below.

In FIG. 9 and FIG. 10, as the action is in progress, each reference numeral is followed by a hyphen, a stepwise increasing number indicating the step of action, and 'A' denoting the system 1.

It is assumed that both PE $3_1$ and PE $3_2$ at the outset are initialized with no contents written in any of the NSVL, the DTCM, the SM, the DM, and the IM.

It is also assumed that the CP broadcasts, to both PE $3_1$ and PE $3_2$, {EXEC, [(1)52], [(1)50], [(2)50], +,=} (executable instruction for the program statement meaning [(1)52]=[(1)50]+[(2)50]).

In this condition, as the variable identifier [(1)52], indicative of a result storage address, belongs in memory device $4_1$, OCU $32_1$-1A in PE $3_1$ is set so that the above arithmetic operation will be performed in a data-driven manner, and the variable identifier [(1)52] is written in NSVL $5_1$-1A. And a data fetch request for the address (1)50 is made to memory device $4_1$. In CCU $33_1$-1A, the variable identifier [(1)50] and the destination (1) (meaning PE $3_1$) are written in an unoccupied cell of DTCM $6_1$ so that the data transfer will take place toward the destination PE through the packet switched network when the corresponding variable data is obtained. Similarly, in connection with the variable [(2)50], the CCU in PE $3_2$ is set as in $33_2$-1A, and a data fetch request for the address (2)50 is made to memory device $4_2$.

It is assumed that, in succession to the above broadcasting, the CP broadcasts {EXEC, [(2)51], [(1)52], [(1)51], 4, *, −,=} (executable instruction for the program statement meaning [(2)51]=[(1)52]−([(1)51]*4)). As the variable identifier [(2)51], indicative of a result storage address, belongs in memory device $4_2$, the OCU in PE $3_2$ is set as in $32_2$-2A, and the variable identifier [(2)51] is written in NSVL $5_2$-2A. In PE $3_1$, the CCU is set as in $33_1$-2A so that each data transfer to PE $3_2$, concerning the variable [(1)52]/[(1)51], will be performed when its corresponding data is obtained, by assigning an unoccupied cell of the DTCM to each of the variables [(1)52], [(1)51]. A data fetch request for the address (1)51 is made to memory device $4_1$. Since the variable identifier [(1)52] is found in NSVL $5_1$-2A, the data of the variable [(1)52] is arranged so as to be transmitted from OCU $32_1$ to CCU $33_1$ when the data is obtained. In the meantime, when the data '7' of the variable [(1)50] is transmitted from memory device $4_1$ to PE $3_1$, by virtue of the associative function of DTCM $6_1$, the data transfer concerning the variable [(1)50] becomes performable as shown in $33_1$-2A in FIG. 9. So, the packet containing both the variable identifier [(1)50] and its corresponding variable data '7' is sent out through the packet switched network. Similarly, the data transfer concerning the variable [(2)50] is performed in CCU $33_2$-2A in PE $3_2$.

As a result of the above data transfers, OCU $32_1$-3A in PE $3_1$ comes with [(1)50]=7, [(2)50]=3, and the part of the program statement, {[(1)50], [(2)50],+} (meaning [(1)50]+[(2)50]), becomes performable, and it is then performed. The arithmetic operation result '10' is substituted for it.

Then, the content in OCU $32_1$-4A becomes {[(1)52], 10,=} (meaning [(1)52]=10). Since this means that the variable [(1)52] has determined its value, that data is transmitted to memory device $4_1$ and to CCU $33_1$.

When the data '10' of the variable [(1)52] is transmitted from OCU $32_1$-4A to CCU $33_1$-5A, the data transfer to the destination (2) (meaning PE $3_2$) becomes performable through the packet switched network.

On storing the data of the variable [(1)52] in its storage area in memory device $4_1$, the variable identifier [(1)52] is deleted from NSVL $5_1$-5A.

Similar steps are performed until a data '2' is obtained as the data of the variable [(2)51] and is stored in its storage area in memory device $4_2$. Thus, the execution of the contents defined by the two program statements mentioned above is terminated.

The actual state does not necessarily agree with the state in each step shown in FIG. 9 and FIG. 10; the time required for each action and the timing of each action depend on the momentary state and the detailed structure of the packet switched network and other components.

The above embodiment has been described based on a system made of two sets of a PE and a memory device. According to the present invention, however, any number of PEs may be employed.

Next, the system 2 according to the present invention is described.

Also in the system 2 as shown in FIG. 1, a control processor (CP) 1 is connected to each of the processor elements (PEs) $3_1$-$3_n$ by a broadcast network 21. Each of the PEs $3_1$-$3_n$ is connected to its corresponding one of the memory devices $4_1$-$4_n$ so that direct access is allowed between them. A packet switched network 22 allows data communications among PEs $3_1$-$3_n$ and the CP 1.

In the system 2, a certain part of a job is described in the form of a set of subsections each of which is assigned to one of the PEs, so that the part of the job is executed, in parallel, by the plurality of the PEs. With each subsection stored in its corresponding memory device, the CP may instruct PEs to activate respectively corresponding subsections whose respective storage areas are indicated.

In each PE instructed to activate any subsection, the subsection is loaded from the corresponding memory device, and the operation control unit (OCU) and/or the communication control unit (CCU), both described below, are set so that the contents of the subsection will be performed in a data-driven manner. When the subsection is fully loaded, the PE so notifies the CP.

In each of the OCU and the CCU in the PE, any operation or any data transfer performable with required data fully prepared, is automatically performed.

When the execution of the contents of the subsection is completed, the PE again so notifies the CP.

In the system 2 according to the present invention, even when part of the contents of the subsections remain to be performed in some PEs, the CP can, as a general rule, activate other subsections, one after another.

When the CP instructs PEs to activate respectively corresponding subsections, indirect addressing using pointers may be utilized to indicate, to each of the PEs, the storage area of its corresponding subsection. In this case, each of the PEs can simultaneously activate its corresponding one of a plurality of subsections according to a set of pointers whose respective storage areas are indicated by the CP at a time.

Described below is the action of the components which make up the system 2 of the present invention.

(I) Control Processor (CP)

With each subsection stored in its corresponding memory device, the CP may instruct each of PEs to activate its corresponding subsection by issuing a CALL command whereby the storage area of the above subsection is indicated.

Each PE is designed to notify the CP when loading of the assigned subsection from the memory device is completed and when the execution of the contents of the assigned subsection based on a data-driven manner is completed. So, the CP can instruct PEs to activate other subsections, one after another, in accordance with progress in the execution of the contents of already activated subsections, without damaging the mutual relationship among instructions and that among data.

(II) Processor Element (PE)

As in the system 1, each PE in the system 2 comprises a control unit (CU), an operation control unit (OCU) and a communication control unit (CCU).

(II-1) Control Unit (CU)

In the CU in each PE in the system 2, when the program element in a program statement loaded from the memory device represents a variable identifier which is a modified address expression, address calculation is immediately performed to replace the modified address expression.

As in the system 1, in order to avoid confusion in connection with a change of a variable data, each CU in the system 2 has a non-stored variable list (NSVL) for holding addresses of a storage area in which a data has not been stored yet although the PE was set so as to store that data in the memory device.

The action of the CU in the system 2 is described below.

In the system 2, when the CP instructs the CU in a PE to activate a subsection by a CALL command, the CU loads the subsection from the memory device and sets the OCU and/or the CCu so that the operations and/or the data transfers specified in the subsection will be performed in a data-driven manner.

When the subsection the CP instructed the CU to activate is fully loaded from the memory device, and when the operations and/or the data transfers specified in the subsection are fully performed in a data-driven manner, the CU so notifies the CP.

In this embodiment, it is assumed that a subsection comprises a CALC command for setting the OCU to perform arithmetic/logic operations defined by a program statement and/or a SEND command for setting the CCU to perform a data transfer.

(a) By means of a CALC command, arithmetic/logic operations defined by a program statement which follows the word {CALC} are set so as to be performed in the OCU, and when the result of the calculation defined by the program statement is obtained, the result is stored in the memory device.

In this context, the CU delivers, to the OCU, the program statement which follows the word {CALC} so that the arithmetic/logic operations are set so as to be performed in a data-driven manner.

Besides, in the CU, the result storage address is written in the NSVL when the program statement is loaded, and the result storage address is deleted from the NSVL when the result is stored in its storage area.

(b) By means of a SEND command, a packet containing a variable identifier and its corresponding data is arranged so as to be transferred to a destination PE.

In this context, the CCU is set so that the data transfer specified by the SEND command will be made toward the destination PE when the data corresponding to the variable identifier is obtained.

Besides, if the same variable identifier as the variable identifier to be transferred does not exist in the NSVL, the CU makes a fetch request for the corresponding variable data to the memory device. Conversely, if the same variable identifier exists in the NSVL, the PE is set so that, when the corresponding variable data is obtained in the OCU, the corresponding variable data will be transmitted to the CCU.

Unlike the system 1, in the system 2, essential data communications among PEs concerning operands are specified explicitly in subsections.

As in the system 1, it may be possible for the CP to be notified of various control information mentioned as above by establishing signal lines. Alternatively, a dedicated device may be provided to collect control information from all the PEs.

(II-2) Operation Control Unit (OCU)

As in the system 1, the OCU in each PE in the system 2 comprises a stack memory (SM), a data memory (DM), an instruction memory (IM) and an operation unit (OU). The OCU is so designed that it performs arithmetic/logic operations defined by a program statement delivered from the CU, in a data-driven manner. In the system 2 according to the present invention, the program statement delivered from the CU to the OCU has been originally loaded from the memory device by the CU as part of a subsection.

(II-3) Communication Control Unit (CCU)

As in the system 1, the CCU in each PE in the system 2 is so designed that it performs data transfers to a destination PE through the packet switched network. Each CCU is provided with a data transfer control memory (DTCM).

Also as in the system 1, in the system 2 according to the present invention, each time the CU requests the CCU to set a data transfer by specifying both a variable identifier to be transferred and a destination PE, an unoccupied cell of the DTCM is secured, and entries are made both in the transfer variable field and in the destination field of the secured DTCM cell.

Each variable data to be transferred is designed to be transmitted, together with its corresponding variable identifier, either from the OCU $32_i$ or from the memory device $4_i$. When a variable data, together with its corresponding variable identifier, is transmitted to the CCU, by virtue of the associative function of the DTCM, the variable identifier is simultaneously compared with variable identifiers each of which is held in one of the transfer variable fields of the DTCM, and the variable data is written in the transfer data field of each DTCM cell matched by comparison.

The content in a DTCM cell in which an entry of the data to be transferred has been made is sent out through the packet switched network. Then, the DTCM cell is freed, making it available for another data transfer.

In the embodiment, it is assumed for simplicity that data transfers to the OCU in the same PE go from the CCU through the packet switched network.

Referring now to FIG. 7, FIG. 8, FIG. 11 and FIG. 12, the behavior of the system 2 according to the present invention is described below, wherein the system 2 comprises two PEs, $3_1$ and $3_2$, connected to memory devices $4_1$ and $4_2$ respectively.

FIG. 7 and FIG. 8 show initial contents stored in memory devices $4_1$ and $4_2$ respectively. (In the following, (1) and (2) preceding any number refer to memory devices $4_1$ and $4_2$, respectively. For example, (1)20 represents the address 20 in memory device $4_1$, and [(1)20] represents the variable or the variable identifier having its data storage area in the address (1)20).

Figure 11:
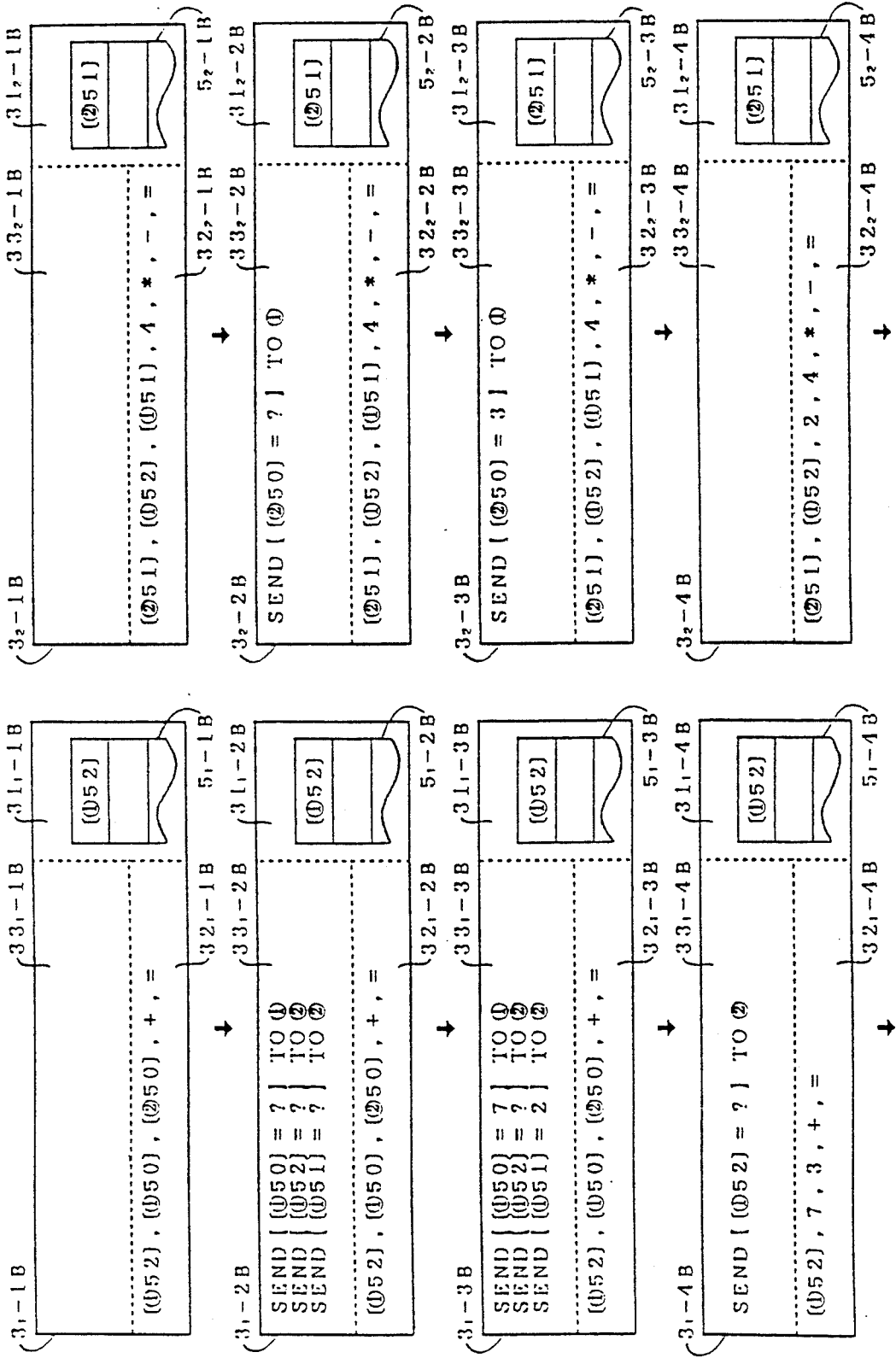
FIG. 11 shows the behavior of the above-mentioned two PEs in the system 2.
Figure 12:
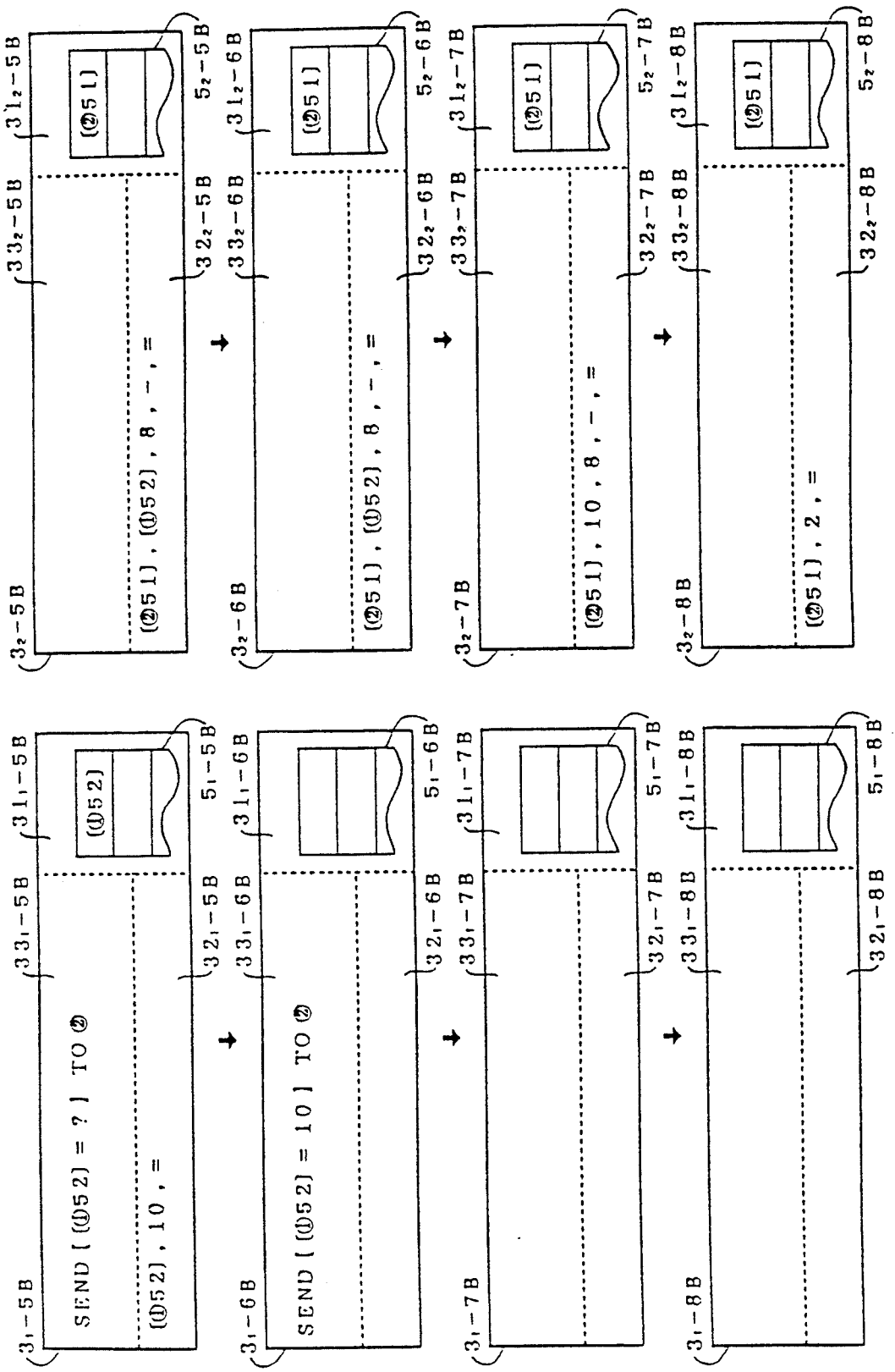
FIG. 12 shows the behavior of the above-mentioned two PEs in the system 2.

FIG. 11 and FIG. 12 illustrate the behavior of the above two PEs in the system 2 according to the present invention. Referring to both figures, the behavior is described below.

In FIG. 11 and FIG. 12, as the action is in progress, each reference numeral is followed by a hyphen, a stepwise increasing number indicating the steps of action, and 'B' denoting the system 2.

It is assumed that both PE $3_1$ and PE $3_2$ at the outset are initialized.

It is also assumed that the CP simultaneously instructs each of PEs, $3_1$ and $3_2$, to activate its corresponding subsection whose storage area is indicated by the pointer in the address 10 in its corresponding memory device, by means of a CALL command.

So, in PE $3_1$ six words from the address 20, which the pointer in memory device $4_1$ means, {CALC, [(1)52], [(1)50], [(2)50], +, =} calculation instruction for the program statement meaning [(1)52]=[(1)50]+[(2)50]), are loaded. OCU $32_1$-1B is set so that the above-mentioned arithmetic operation will be performed in a data-driven manner, and the variable identifier [(1)51] indicative of a result storage address is written in NSVL $5_1$-1B. Then, PE $3_1$ notifies the CP of the completion of loading.

In PE $3_2$, on the other hand, eight words from the address 20 in memory device $4_2$, {CALC, [(2)51], [(1)52], [(1)51], 4, *, −, =} (calculation instruction for the program statement meaning [(2)51]=[(1)52]−([(1)51]* 4)), are loaded. OCU $32_2$-1B is set so that the above-mentioned arithmetic operations will be performed in a data-driven manner, and the variable identifier [(2)51] indicative of a result storage address is written in NSVL $5_2$-1B. Then, PE $3_2$ notifies the CP of the completion of loading.

When the CP is notified of the completion of loading of the subsection both from PE $3_1$ and from $3_2$, the CP again instructs each of PEs, $3_1$ and $3_2$, to activate its corresponding subsection whose storage area is indicated by the pointer in the address 11 in its corresponding memory device, by means of a CALL command.

So, in PE $3_1$ nine words form the address 26 in memory device $4_1$, {SEND, [(1)50], TO (1); SEND, [(1)52], TO(2); SEND, [(1)51], TO(2)} (data transfer instructions for transferring the data of the variable [(1)50] to the OCU in PE $3_1$, the data of the variable [(1)52] to the OCU in PE $3_2$, and the data of the variable [(1)51] to the OCU in PE $3_2$), are loaded. An unoccupied cell of the DTCM is assigned to each of the above SEND commands so that each of the above data transfers will be performed through the packet switched network when its corresponding variable data is obtained, thereby setting the CCU as in $33_1$-2B. Since the variable identifiers [(1)50], [(1)51] are not found in NSVL $5_1$-2B, a data fetch request for the address (1)50 and that for the address (1)51 are made to memory device $4_1$. On the other hand, since the variable identifier [(1)52] is found in NSVL $5_1$-2B, the data of the variable [(1)52] is arranged so as to be transmitted from OCU $32_1$ to CCU $33_1$ when the data is obtained in OCU $32_1$. Then, PE $3_1$ notifies the CP of the completion of loading of the subsection.

In PE $3_2$, on the other hand, three words from the address 28 in memory device $4_2$, {SEND, [(2)50], TO (1)} (data transfer instruction for transferring the data of the variable [(2)50] to the OCU in PE $3_1$), are loaded. CCU $33_2$-2B is set so that the above data transfer will be performed through the packet switched network when the corresponding variable data is obtained. Since the variable identifier [(2)50] is not found in NSVL $5_2$-2B, a data fetch request for the address (2)50 is made to memory device $4_2$. Then, PE $3_2$ notifies the CP of the completion of loading of the subsection.

When the data '7'/'2' of the variable [(1)50]/[(1)51] is transmitted from memory device $4_1$ to PE $3_1$, CCU $33_1$-3B sends out the packet including the data and its corresponding variable identifier through the packet switched network; CCU $33_1$-3B recognizes the destination PE by means of the DTCM.

In the same manner, when the data '3' of the variable [(2)50] is transmitted from memory device $4_2$ to PE $3_2$, the data transfer takes place toward the destination (1) (meaning PE $3_1$) through the packet switched network. As this completes the execution of the contents of the subsection made of three words from the address (2)28, the CP is so notified.

As a result of the above data transfers, OCU $32_1$-4B in PE $3_1$ comes with [(1)50]=7, [(2)50]=3, and the part of the program statement, {[(1)50], [(2)50],+} (meaning [(1)50]+[(2)50]), becomes performable, and it is then performed. The arithmetic operation result '10' is substituted for it.

Then, the content in OCU $32_1$-5B becomes {[(1)52], 10, =} (meaning [(1)52]=10). Since this means that the variable [(1)52] has determined its value, that data is transmitted to memory device $4_1$ and to CCU $33_1$.

When the data '10' of the variable [(1)52] is transmitted from OCU $32_1$-5B to CCU $33_1$-6B, the data transfer to the destination (2) (meaning PE $3_2$) becomes performable through the packet switched network.

On storing the data of the variable [(1)52] in its storage area in memory device $4_1$, the variable identifier [(1)52] is deleted from NSVL $5_1$-6B.

As this completes the execution of the contents of the subsection made of six words from the address (1)20 and that of the subsection made of nine words from the address (1)26, the CP is so notified.

Similar steps are performed until a data '2' is obtained as the data of the variable [(2)51] and stored in its storage area in memory device $4_2$. Thus, the execution of the contents of the subsection made of eight words from the address (2)20 is terminated. The CP is so notified. This completes two subsections in each of the two PEs.

The actual state does not necessarily agree with the state in each step shown in FIG. 11 and FIG. 12; the time required for each action and the timing of each action depend on the momentary state and the detailed structure of the packet switched network and other components.

The above embodiment has been described based on a system made of two sets of a PE and a memory device. According to the present invention, however, any number of PEs may be employed.

In the above illustration of the behavior of the system 2 according to the present invention, the CP instructs a plurality of PEs to activate respectively corresponding subsections at a time by using pointers. Alternatively, the CP may individually instruct each PE to activate its corresponding subsection, one after another, by directly indicating the storage area of the subsection.

Furthermore, a computer system may have both the function of the system 1 and the function of the system 2. In such a system, the CP causes the PEs to execute jobs by switching back and forth between the two functions by means of computer programming.

According to the present invention, efficient computation is achieved by running a plurality of PEs in parallel.

Furthermore, since each PE operates independently of the other PEs in a data-driven manner, the PEs may be arranged in a simple control structure. This is advantageous in that programming requires relatively less consideration for the control structure.

What is claimed is:

1. A data-driven electronic computer system comprising:
   a control processor;

a packet switched network;

a plurality of processor elements connected to said control processor and said packet switched network, each processor element having an operation control unit for performing arithmetic/logic operations in a data-driven manner and a communication control unit for performing data transfers between said processor elements through said packet switched network in a data-driven manner; and a plurality of memory devices having one-to-one correspondence with said processor elements, and each being connected to and being directly accessed only by its corresponding one of said processor elements, whereby, when said control processor broadcasts a program statement arranged in reverse Polish notation, said program statement defining arithmetic/logic operations, each of said processor elements assigned to perform the arithmetic/logic operations defined by said program statement sets the operation control unit to perform said arithmetic/logic operations defined by said program statement in a data-driven manner; whereas each of said processor elements which has direct access to a data corresponding to any operand variable in said program statement sets the communication control unit so that, when said data is obtained, said data will be transferred through said packet switched network to the processor element assigned to perform the arithmetic/logic operation by using said data.

2. A data-driven electronic computer system comprising:

a control processor;

a packet switched network;

a plurality of processor elements connected to said control processor and said packet switched network, each processor element having an operation control unit for performing arithmetic/logic operations in a data-driven manner and a communication control unit for performing data transfers between said processor elements through said packet switched network in a data-driven manner; and a plurality of memory devices having one-to-one correspondence with said processor elements, and each being connected to and being directly accessed only by its corresponding one of said processor elements, wherein, with a set of subsections defining a part of a job, and each being assigned to one of said processor elements and being stored in its corresponding one of said memory devices, when said control processor instructs a processor element of said processor elements to activate a subsection of said set of subsections assigned to said processor element, said processor element loads said subsection from its corresponding one of said memory devices and, by processing said subsection, said processor element sets itself to perform in a date-driven manner.

3. The data-driven electronic computer system according to claim 2, wherein, with a subsection and a pointer being stored in a memory device of said memory devices, said pointer indicating the area in which said subsection is stored, said control processor indicates the address holding said pointer in instructing the one of said processor elements which is directly connected to said memory device to activate said subsection.

4. The date-driven electronic computer system according to claim 2, wherein, for the purpose of activating a plurality of subsections at once, with a pointer being stored at the same address in each of said memory devices, said pointer indicating the storage area of a subsection of said plurality of subsections in the same memory device, said control processor indicates said address.

5. A processor element comprising:

a data memory having a plurality of cells each of which is constructed to hold a variable identifier and a variable data, said data memory having an associative function for comparing a variable identifier transmitted to said data memory with variable identifiers each of which is held in one of said cells of said data memory, and writing a variable data in each cell of said data memory holding the same variable identifier as said variable identifier transmitted to said data memory;

a stack memory having a plurality of cells each of which is constructed to hold an address of a cell of said data memory;

an instruction memory having a plurality of cells each of which is constructed to hold an operation code and at least three addresses of a cell of said data memory; and an operation unit for performing an arithmetic/logic operation specified in one of said cells of said instruction memory when all of operand data required for said arithmetic/logic operation are prepared in said data memory, wherein said processor element is set to perform arithmetic/logic operations defined by a program statement arranged in reverse Polish notation in a data-driven manner by carrying out one of the following procedures each time a program element which is a component of said program statement is conveyed to said processor element, namely, for a program element which represents a variable identifier indicative of a result storage address in a memory device, writing said variable identifier indicative of said result storage address in an unoccupied cell of said data memory, and pushing the address of said cell of said data memory in which said variable identifier indicative of said result storage address is written onto said stack memory;

for a program element which represents a variable identifier of an operand, writing said variable identifier of said operand in an unoccupied cell of said data memory, and pushing the address of said cell of said data memory in which said variable identifier of said operand is written onto said stack memory;

for a program element which represents an immediate data, writing said immediate data in an unoccupied cell of said data memory, and pushing the address of said cell of said data memory in which said immediate data is written onto said stack memory;

for a program element which represents an operator to generate a result data, reserving an unoccupied cell of said data memory for said result data, popping addresses of a cell of said data memory, to the number of operands that said operator needs, from said stack memory, writing the code of said operator, said addresses popped from said stack memory and the address of said cell of said data memory reserved for said result data in an unoccupied cell of said instruction memory, and pushing said address of said cell of said data memory reserved for said result data onto said stack memory; and for a program element which represents an operator to generate no result data, popping addresses of a cell of said data memory, to the number of operands that said operator needs, from said stack memory, and writing the code of said operator and said addresses popped from said stack memory in an unoccupied cell of said instruction memory.

* * * * *